(12) United States Patent
Akkarakaran et al.

(10) Patent No.: US 11,706,753 B2
(45) Date of Patent: Jul. 18, 2023

(54) MINIMUM TIME DELAY BETWEEN SIDELINK GRANT AND SCHEDULED SIDELINK DATA TRANSMISSION

(71) Applicant: QUALCOMM Incorporated, San Diego, CA (US)

(72) Inventors: Sony Akkarakaran, Poway, CA (US); Tao Luo, San Diego, CA (US); Jung Ho Ryu, Fort Lee, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/209,812

(22) Filed: Mar. 23, 2021

(65) Prior Publication Data

US 2021/0360654 A1 Nov. 18, 2021

Related U.S. Application Data

(60) Provisional application No. 63/023,681, filed on May 12, 2020.

(51) Int. Cl.
*H04W 76/14* (2018.01)
*H04W 72/04* (2023.01)
*H04W 72/1263* (2023.01)
*H04W 72/02* (2009.01)
*H04W 72/0446* (2023.01)
*H04W 92/18* (2009.01)

(52) U.S. Cl.
CPC ....... *H04W 72/1263* (2013.01); *H04W 72/02* (2013.01); *H04W 72/0446* (2013.01); *H04W 76/14* (2018.02); *H04W 92/18* (2013.01)

(58) Field of Classification Search
CPC ............ H04W 72/02; H04W 72/0446; H04W 72/1263; H04W 76/14; H04W 92/18
See application file for complete search history.

(56) References Cited

U.S. PATENT DOCUMENTS

| | | | |
|---|---|---|---|
| 2020/0113015 A1* | 4/2020 | Basu Mallick | H04W 4/46 |
| 2020/0314816 A1* | 10/2020 | Yi | H04W 72/1294 |
| 2021/0400580 A1* | 12/2021 | Maleki | H04W 52/0216 |
| 2022/0191896 A1* | 6/2022 | Panteleev | H04W 72/1263 |

* cited by examiner

*Primary Examiner* — Brian P Cox
(74) *Attorney, Agent, or Firm* — Harrity & Harrity, LLP

(57) ABSTRACT

Various aspects of the present disclosure generally relate to wireless communication. In some aspects, a user equipment (UE) may receive a sidelink grant scheduling a sidelink data transmission associated with one or more sidelink resources. The UE may determine a minimum time delay between the sidelink grant and the sidelink data transmission scheduled by the sidelink grant based at least in part on a value associated with a sidelink minimum-k parameter configured for the UE. Numerous other aspects are provided.

30 Claims, 8 Drawing Sheets

500 ⟶

522
Determine minimum time delay between sidelink grant and scheduled sidelink transmission according to value of sidelink minimum-k parameter 520
Receive sidelink grant scheduling a sidelink transmission associated with one or more sidelink resources

SL UE
510

Scheduler
515

524
Turn off RF front end based at least in part on minimum time delay between sidelink grant and scheduled sidelink data transmission

MINIMUM TIME DELAY BETWEEN SIDELINK GRANT AND SCHEDULED SIDELINK DATA TRANSMISSION

CROSS-REFERENCE TO RELATED APPLICATION

This patent application claims priority to U.S. Provisional Patent Application No. 63/023,681, filed on May 12, 2020, entitled "MINIMUM TIME DELAY BETWEEN SIDE-LINK GRANT AND SCHEDULED SIDELINK DATA TRANSMISSION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for providing a minimum time delay between a sidelink grant and a scheduled sidelink data transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include: receiving a sidelink grant scheduling a sidelink data transmission associated with one or more sidelink resources; and determining a minimum time delay between the sidelink grant and the sidelink data transmission scheduled by the sidelink grant based at least in part on a value associated with a sidelink minimum-k parameter configured for the UE.

In some aspects, a UE for wireless communication may include a memory and one or more processors, coupled to the memory, configured to: receive a sidelink grant scheduling a sidelink data transmission associated with one or more sidelink resources; and determine a minimum time delay between the sidelink grant and the sidelink data transmission scheduled by the sidelink grant based at least in part on a value associated with a sidelink minimum-k parameter configured for the UE.

In some aspects, a non-transitory computer-readable medium may store one or more instructions for wireless communication. The one or more instructions, when executed by one or more processors of a UE, may cause the UE to: receive a sidelink grant scheduling a sidelink data transmission associated with one or more sidelink resources; and determine a minimum time delay between the sidelink grant and the sidelink data transmission scheduled by the sidelink grant based at least in part on a value associated with a sidelink minimum-k parameter configured for the UE.

In some aspects, an apparatus for wireless communication may include: means for receiving a sidelink grant scheduling a sidelink data transmission associated with one or more sidelink resources; and means for determining a minimum time delay between the sidelink grant and the sidelink data transmission scheduled by the sidelink grant based at least in part on a value associated with a sidelink minimum-k parameter configured for the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
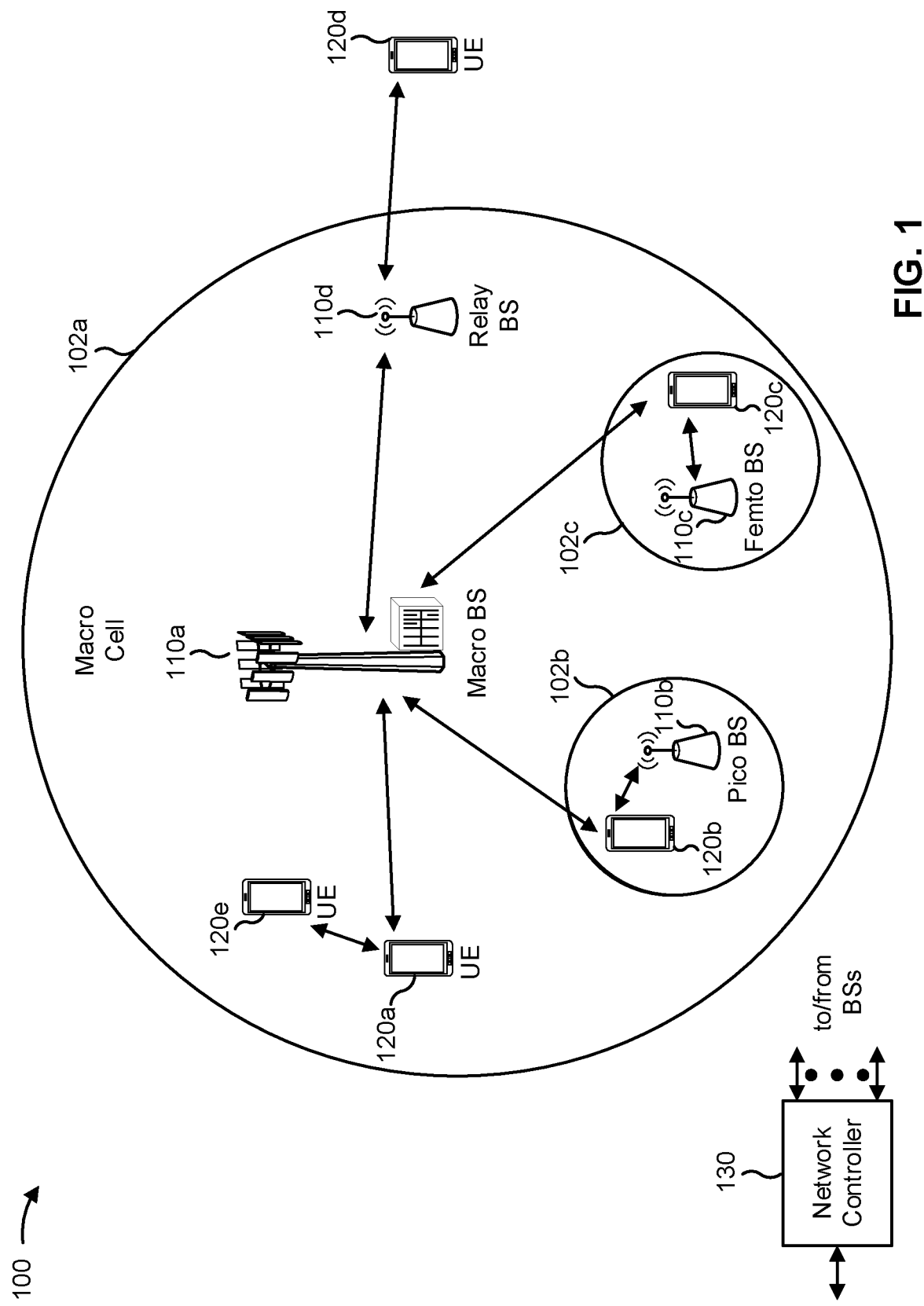
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
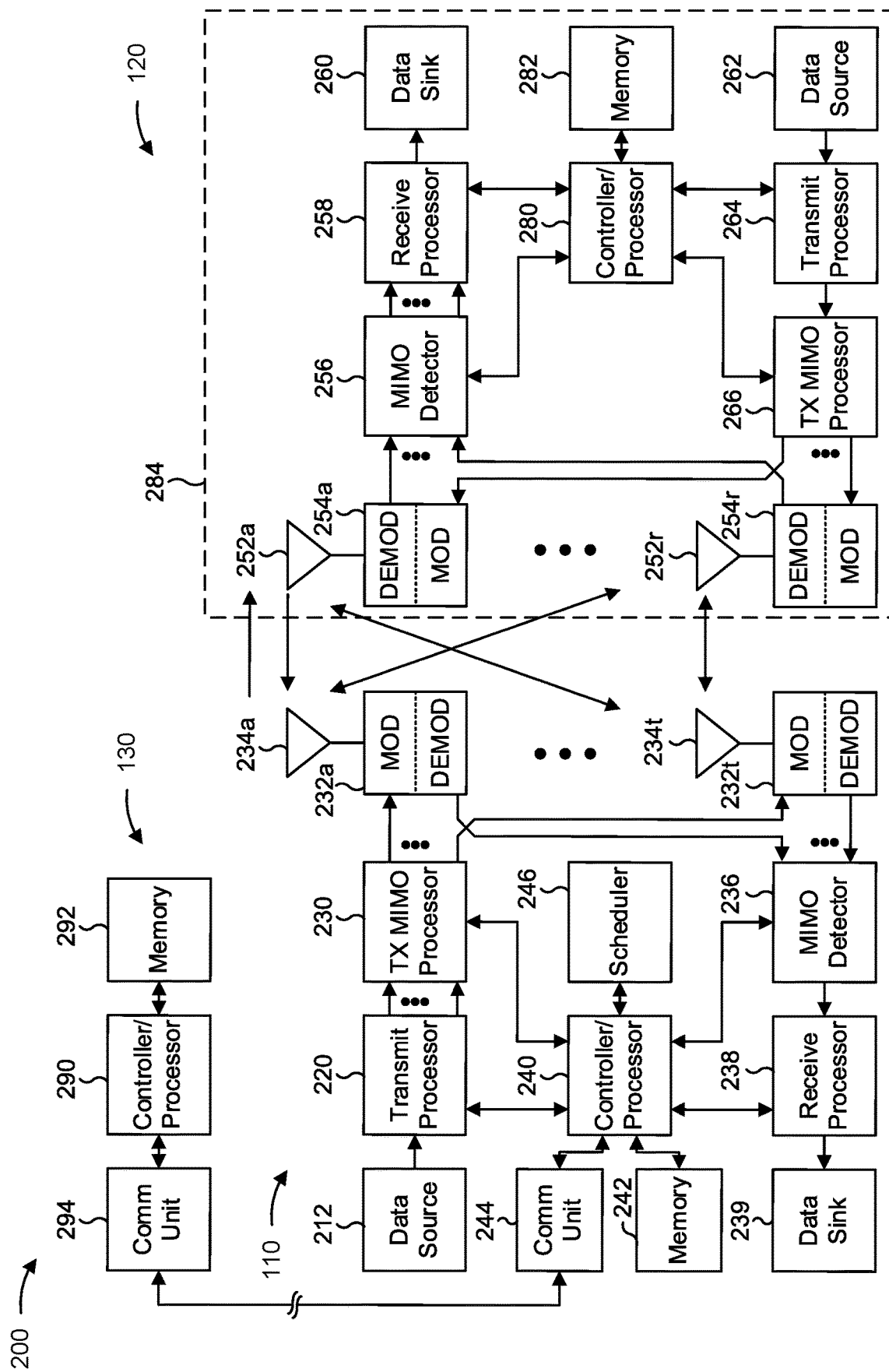
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 5-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 5-6).

Controller/processor 240 of base station 110, controller/processor 280 of UE 120, and/or any other component(s) of FIG. 2 may perform one or more techniques associated with a minimum time delay between a sidelink grant and a scheduled sidelink data transmission, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, UE 120 may include means for receiving a sidelink grant scheduling a sidelink data transmission associated with one or more sidelink resources, means for determining a minimum time delay between the sidelink grant and the sidelink data transmission scheduled by the sidelink grant based at least in part on a value associated with a sidelink minimum-k parameter configured for UE 120, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
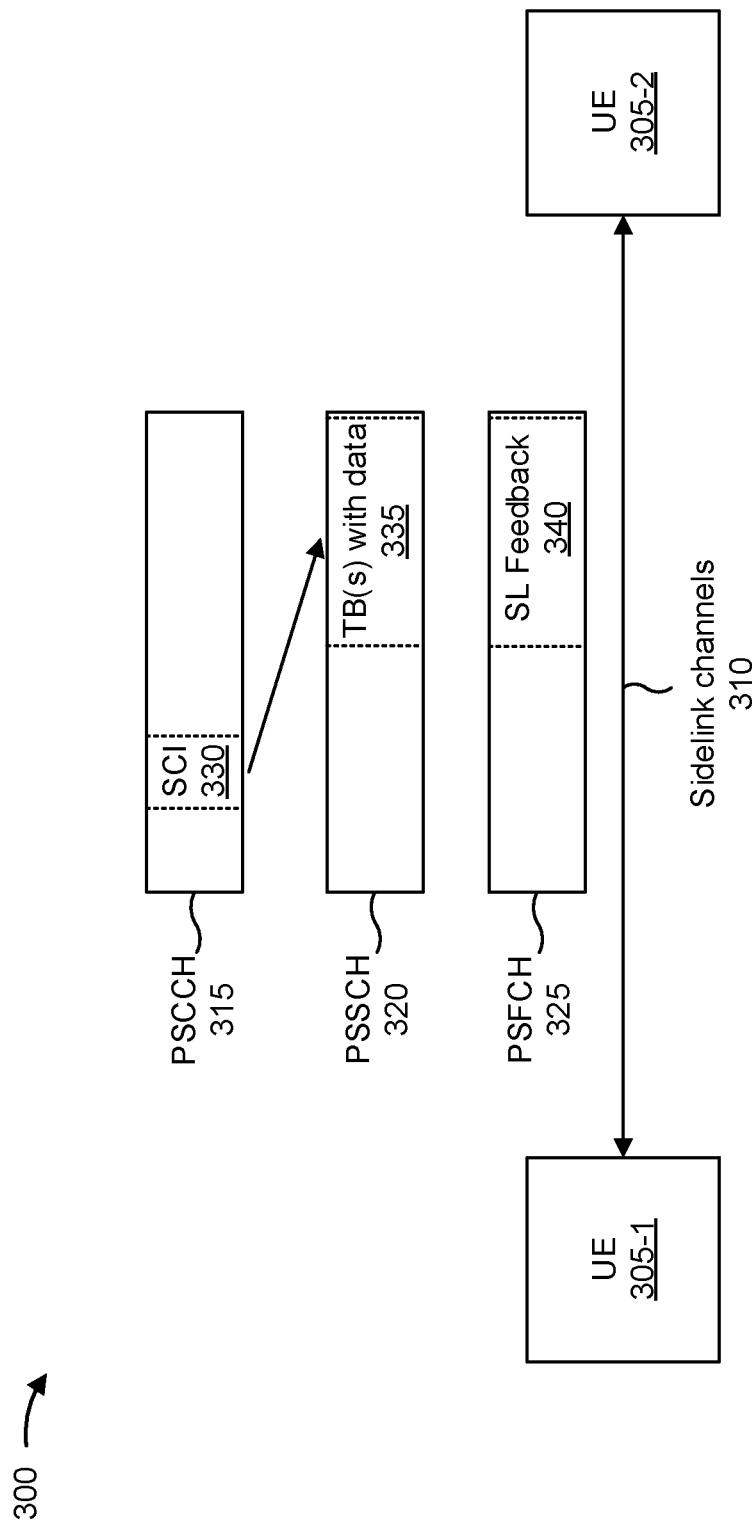
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, V2N communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
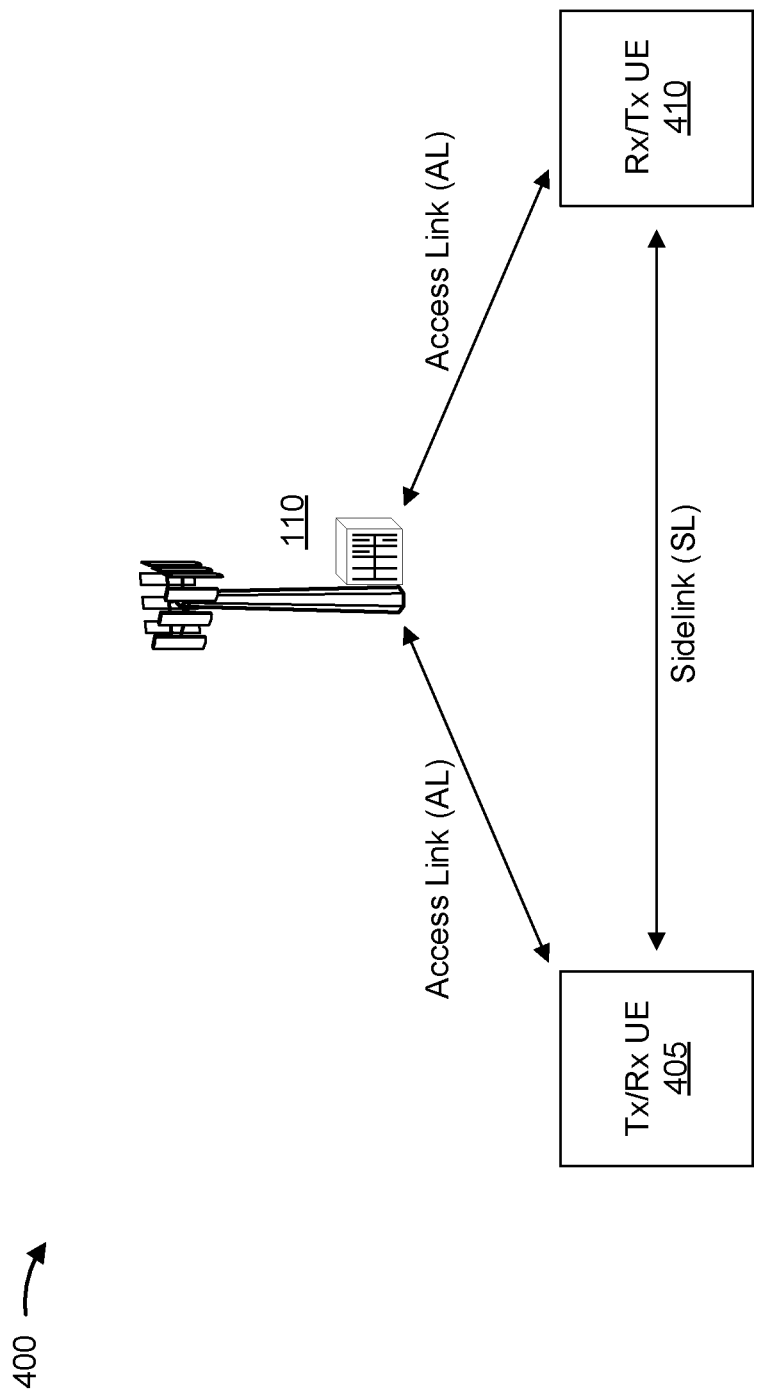
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown in FIG. 4, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. In some aspects, the Tx/Rx UE 405 and/or the Rx/Tx UE 410 may correspond to one or more UEs described elsewhere herein, such as the UE 120 of FIG. 1, the UE(s) 305 of FIG. 3, and/or the like. Thus, a direct link between UEs 120 (e.g., a PC5 interface) may be referred to as a sidelink, and a direct link between a base station 110 and a UE 120 (e.g., a Uu interface) may be referred to as an access link. In some aspects, sidelink communications may be transmitted via the sidelink, and access link communications may be transmitted via the access link(s). An access link communication may be either a downlink communication (from a base station 110 to a UE 120) or an uplink communication (from a UE 120 to a base station 110).

In a wireless access network, such as an LTE network, an NR network, and/or the like, one or more minimum-k (or min-k) parameters may be configured to enable power savings for a UE. For example, the minimum-k parameters may include a k0 parameter that defines a minimum delay between a downlink grant carried in a PDCCH and a PDSCH communication scheduled by the downlink grant. In another example, the minimum-k parameters may include a k2 parameter that defines a minimum delay between an uplink grant carried in a PDCCH and a PUSCH communication scheduled by the uplink grant. In general, the k0 and k2 parameters may be expressed according to a number of slots, and there may be corresponding parameters (e.g., n0, n2, and/or the like) that are expressed according to a number of OFDM symbols. For simplicity of description, some aspects are described herein in the context of minimum-k parameters. However, it will be appreciated that the same or similar concepts can be applied to the corresponding n-parameters.

In some cases, as described above, the minimum time delay indicated by the value of a minimum-k parameter can be utilized to reduce power consumption by a UE. For example, allowed values of the k0, k2 parameters generally include integers from zero (0) to sixteen (16), where a slot duration is based on a bandwidth part numerology or subcarrier spacing (e.g., a larger subcarrier spacing may be associated with a shorter slot duration, whereby the time delay between a PDCCH and a PDSCH or PUSCH scheduled by the PDCCH may depend on the numerology or subcarrier spacing associated with a bandwidth part). Accordingly, if the value of a minimum-k parameter is greater than 0, a UE receiving a PDCCH can buffer PDCCH samples, enter a partial sleep state (e.g., by turning off a radio frequency front-end (RFFE) of the UE), and decode the PDCCH during operation in the partial sleep state. Furthermore, if the UE receives a downlink grant or an uplink grant in the PDCCH, then the UE may wake up (e.g., by turning on the RFFE) to receive a PDSCH communication or transmit a PUSCH communication. Otherwise, the UE may remain in the partial sleep state until a later time (e.g., when the UE receives another PDCCH). Accordingly, a non-zero minimum-k parameter may reduce power consumption relative to a minimum-k parameter having a zero value because the RFFE has to remain on while the UE buffers possible PDCCH samples, even if the PDCCH decoding ultimately reveals that the PDCCH did not carry a grant for the UE. Furthermore, these power savings may increase as the values of the (one or more) minimum-k parameters increase (e.g., by enabling a longer and/or more efficient sleep state because the UE can turn the RFFE off for a longer time period while buffering and decoding PDCCH samples). However, these potential power savings are limited to access networks, as minimum-k parameters applicable to access networks are not defined for or applicable to sidelink communications.

Some aspects described herein provide techniques and apparatuses for providing a minimum time delay between a sidelink grant and a scheduled sidelink data transmission. For example, in some aspects, a UE may receive, from a scheduler node (e.g., a base station or another UE), a sidelink grant scheduling a sidelink data transmission associated with one or more sidelink resources. The UE may determine a minimum time delay between the sidelink grant and the sidelink data transmission scheduled by the sidelink grant based at least in part on a value associated with a sidelink minimum-k parameter configured for the UE. Accordingly, the UE may then operate in a partial sleep-state based at least in part on the minimum time delay (e.g., when the sidelink minimum-k parameter has a non-zero value). In this way, the techniques and apparatuses described herein reduce power consumption by the UE, for example, by enabling the UE to temporarily turn off an RFFE and turn the RFFE back on only when needed to transmit and/or receive the scheduled sidelink data transmission. Additional details and examples are provided below with regard to FIG. 5.

As indicated above, FIG. 4 is provided as an example. Other examples may differ from what is described with respect to FIG. 4.

Figure 5:
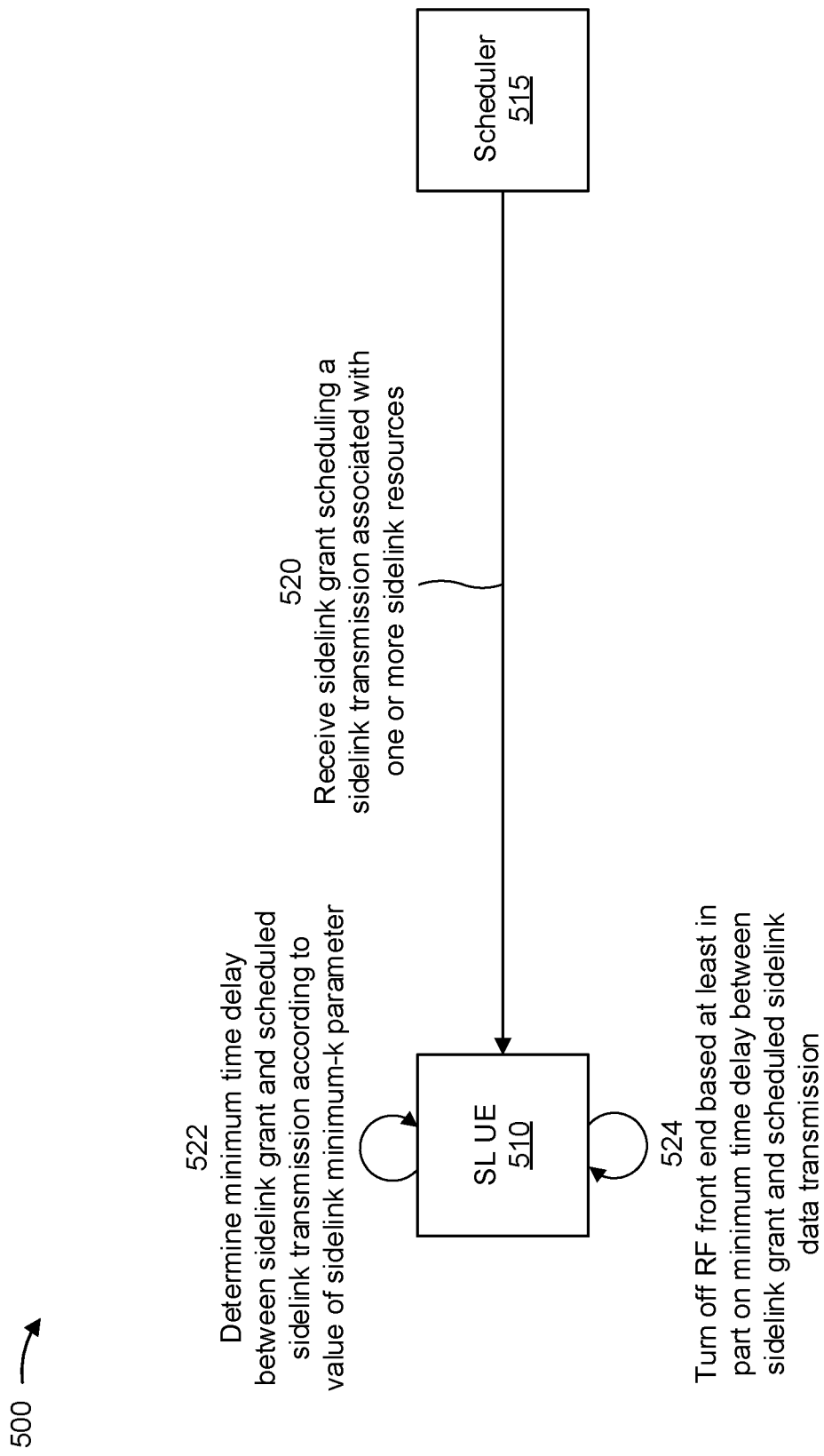
FIG. 5 is a diagram illustrating an example of providing a minimum time delay between a sidelink grant and a scheduled sidelink data transmission, in accordance with the present disclosure.

FIG. 5 is a diagram illustrating an example 500 of providing a minimum time delay between a sidelink grant and a scheduled sidelink data transmission, in accordance with the present disclosure. As shown in FIG. 5, example 500 includes a sidelink UE 510 (e.g., which may correspond to UE 120a and/or UE 120e, UE 305-1 and/or UE 305-2, UE 405 and/or UE 410, and/or the like), and the sidelink UE 510 may be in communication with a scheduler node 515 (e.g., a base station 110, another sidelink UE, and/or the like). In some aspects, the sidelink UE 510 and the scheduler node 515 may communicate in a wireless network, such as wireless network 100. For example, in some aspects, the sidelink UE 510 and the scheduler node 515 may communicate over an access link using a Uu interface in cases where the scheduler node 515 is a base station, over a sidelink using a PC5 interface in cases where the scheduler node 515 is another UE, and/or the like.

As shown in FIG. 5, and by reference number 520, the scheduler node 515 may transmit, and the sidelink UE 510 may receive, a sidelink grant that schedules a sidelink data transmission associated with one or more sidelink resources (e.g., a set of time and frequency resources, resource blocks, resource elements, and/or the like allocated to the sidelink data transmission). For example, in cases where the scheduler node 515 is a base station, the sidelink grant may be a mode-1 sidelink grant that is transmitted by the base station on a Uu interface (e.g., an access link). In this case, the mode-1 sidelink grant may be transmitted in downlink control information (DCI) with DCI format 3_0 to indicate that the sidelink grant is for the sidelink UE 510 to perform the sidelink data transmission (e.g., a PSSCH), or the mode-1 sidelink grant may be transmitted in DCI with DCI format 3_1 to indicate that the sidelink grant is for the sidelink UE 510 to receive the sidelink data transmission from another UE. Furthermore, in some aspects, the sidelink grant may indicate a radio access technology (RAT) associated with the scheduled sidelink data transmission to be transmitted and/or received by the sidelink UE 510. For example, the sidelink grant may indicate that the scheduled sidelink data transmission is an LTE sidelink data transmission, an NR sidelink data transmission, and/or the like.

Additionally, or alternatively, in cases where the scheduler node 515 is another UE, the sidelink grant may be transmitted by the other UE on a PC5 interface (e.g., a sidelink). In this case, the sidelink grant may be a mode-2 sidelink grant in which a transmitting UE (e.g., the other UE) self-selects the sidelink resources to be used for the sidelink data transmission from configured transmission (Tx) and reception (Rx) resource pools according to one or more rules aimed at minimizing a risk of collision with other sidelink transmissions, a mode-3 sidelink grant in which the scheduler node 515 selects the sidelink resources from sidelink resources allocated by a base station, a mode-4 sidelink grant in which the scheduler node 515 autonomously selects the sidelink resources using distributed scheduling and/or congestion control techniques, and/or the like. Furthermore, in cases where the scheduler node 515 is another UE, the sidelink grant may be transmitted in sidelink control information (SCI) via a PSCCH, a sidelink medium access control (MAC) control element (MAC-CE), and/or the like, and the sidelink grant may indicate whether the sidelink grant is for the sidelink UE 510 to perform the sidelink data transmission or for the sidelink UE 510 to receive the sidelink data transmission from the other UE. Furthermore, in some aspects, the sidelink grant may indicate that the scheduled sidelink data transmission is an LTE sidelink data transmission, an NR sidelink data transmission, and/or the like.

As further shown in FIG. 5, and by reference number 522, the sidelink UE 510 may determine a minimum time delay (e.g., a minimum number of slots) between the sidelink grant and the scheduled sidelink data transmission based at least in part on a value of a sidelink minimum-k parameter configured for the sidelink UE 510. For example, in some aspects, the sidelink UE 510 may be configured with a first sidelink minimum-k parameter (e.g., $kSL_{Tx}$ and/or the like) that applies to sidelink data transmissions to be performed by the sidelink UE 510, and a second sidelink minimum-k parameter (e.g., $kSL_{Rx}$ and/or the like) that applies to sidelink data transmissions to be received by the sidelink UE 510. Additionally, or alternatively, the sidelink UE 510 may be configured with a common sidelink minimum-k parameter (e.g., kSL and/or the like) applicable to both sidelink data transmissions to be performed by the sidelink UE 510 and to sidelink data transmissions to be received by the sidelink UE 510.

In some aspects, the sidelink minimum-k parameter(s) configured for the sidelink UE 510 may be specific to a particular RAT (e.g., LTE sidelink transmissions and NR sidelink transmissions may have separate sidelink minimum-k parameters), or the sidelink minimum-k parameter(s) configured for the sidelink UE 510 may be applicable to different RATs. Furthermore, in some aspects, the sidelink minimum-k parameter(s) may have values that are separately configured (e.g., via radio resource control (RRC) signaling, sidelink signaling messages, and/or the like), or the sidelink minimum-k parameter(s) may have values that are implicitly based at least in part on values of minimum-k0 and/or minimum-k2 parameters that are configured for access link communications (e.g., the value(s) of the sidelink minimum-k parameter(s) may be a function of the value(s) of the access link minimum-k parameter(s)). For example, the sidelink minimum-k parameter(s) may have values that are equal to the values of the minimum-k0 and/or minimum-k2 parameters configured for access link communications, or an integer value may be added to and/or subtracted from the values of the minimum-k0 and/or minimum-k2 parameters configured for access link communications to determine the value(s) of the sidelink minimum-k parameter(s). Furthermore, the sidelink minimum-k parameter(s) may have different values or the same values for different types of sidelink grants (e.g., mode-1 sidelink grants that are scheduled by a base station versus other sidelink grants that are scheduled by a UE).

In some aspects, the sidelink minimum-k parameter(s) may have one or more configured values, which may be configured per bandwidth part. Additionally, or alternatively, in some aspects, the sidelink minimum-k parameter(s) may have multiple configured values per bandwidth part. Accordingly, in some aspects, one or more techniques may be used to indicate and/or change the configured value for a sidelink minimum-k parameter and/or to toggle or otherwise cycle between different values that are configured for the sidelink minimum-k parameter. For example, as described above, the sidelink grant may be included in DCI, SCI, and/or the like, which may include one or more fields to indicate or otherwise configure the value for the sidelink minimum-k parameter applicable to the scheduled sidelink data transmission, to change a configured value for the sidelink minimum-k parameter applicable to the scheduled sidelink data transmission, to toggle or cycle between different configured values for the sidelink minimum-k parameter applicable to the scheduled sidelink data transmission, and/or the like. Additionally, or alternatively, the value(s) for the sidelink minimum-k parameter(s) may be configured, changed, toggled, and/or the like via RRC signaling, a MAC-CE, sidelink signaling, and/or other suitable signaling.

In some aspects, the value(s) for the sidelink minimum-k parameter(s) may be configured, changed, toggled, and/or the like concurrently with and/or separately from access link minimum-k parameters (e.g., k0 and/or k2 parameters) configured, changed, toggled, and/or the like via Uu grants. In the former (concurrent) case, the value(s) of the access link minimum-k parameter(s) may be configured, changed, and/or toggled when a sidelink grant configures, changes, and/or toggles the value of a sidelink minimum-k parameter, or vice versa. In the latter (separate) case, the value(s) of the access link minimum-k parameter(s) may be unaffected when a sidelink grant configures, changes, and/or toggles the value of a sidelink minimum-k parameter, and the value(s) of the sidelink minimum-k parameter(s) may be unaffected when a Uu grant configures, changes, and/or toggles the value of an access link minimum-k parameter. Furthermore, in cases where the sidelink UE 510 receives more than one message (e.g., from the scheduler node 515) that causes the value of one or more sidelink minimum-k parameters to be configured, changed, and/or toggled, the sidelink UE 510 may apply a rule that a first (e.g., earliest in time) toggle has to complete processing before a next toggle can be applied. In other words, the sidelink UE 510 may be configured to discard one or more toggle messages that are received while an earlier toggle message has yet to become effective.

Furthermore, in the case of a mode-1 sidelink grant that configures, changes, or toggles the value of the sidelink minimum-k parameter, the mode-1 sidelink grant may be treated as a cross-component carrier or cross-bandwidth part grant, and a sidelink numerology with a scheduled numerology may be used to determine an applicability time for the toggle (e.g., a time when the toggle becomes effective). Alternatively, in some aspects, the mode-1 sidelink grant may be treated as an intra-component carrier or intra-bandwidth part grant, and either the sidelink numerology or the scheduled numerology may be used to determine the toggle applicability time.

As further shown in FIG. 5, and by reference number 524, the sidelink UE 510 may turn off an RFFE based at least in part on the minimum time delay that is determined from the value of the sidelink minimum-k parameter applicable to the sidelink grant. For example, as described above, the sidelink UE 510 may turn off the RFFE to conserve power in cases where the sidelink minimum-k parameter has a non-zero value. In such cases, the sidelink UE 510 may subsequently turn on the RFFE to transmit the sidelink data transmission or receive the sidelink data transmission after the minimum time delay has elapsed. Alternatively, the sidelink UE 510 may refrain from turning off the RFFE in cases where the sidelink minimum-k parameter has a zero value or when the sidelink grant scheduling the sidelink data transmission satisfies an exception condition. For example, in some aspects, the sidelink minimum-k parameter may not apply to sidelink grants received in certain control resource sets (CORESETs), search spaces (SSs), DCIs that have certain formats or are scheduled with certain radio network temporary identifiers (RNTIs), and/or the like. For example, in some aspects, an access link minimum-k parameter may not apply in cases where a scheduling PDCCH includes DCI with a system information RNTI (SI-RNTI) in a type0 or type0A common search space (CSS), a random access RNTI (RA-RNTI) or temporary cell RNTI (TC-RNTI) in a type1 CSS, a paging RNTI (P-RNTI) in a type2 CSS, or a cell RNTI (C-RNTI), a configured scheduling RNTI (CS-RNTI), or a modulation coding scheme RNTI (MCS-RNTI) in any CSS associated with CORESET0 if a default time domain resource allocation (TDRA) table is applied. Accordingly, in some aspects, the exception condition applicable to the sidelink minimum-k parameter may be satisfied for related or similar CORESETs, SSs, DCIs, RNTIs associated with sidelink formats.

As indicated above, FIG. 5 is provided as an example. Other examples may differ from what is described with respect to FIG. 5.

Figure 6:
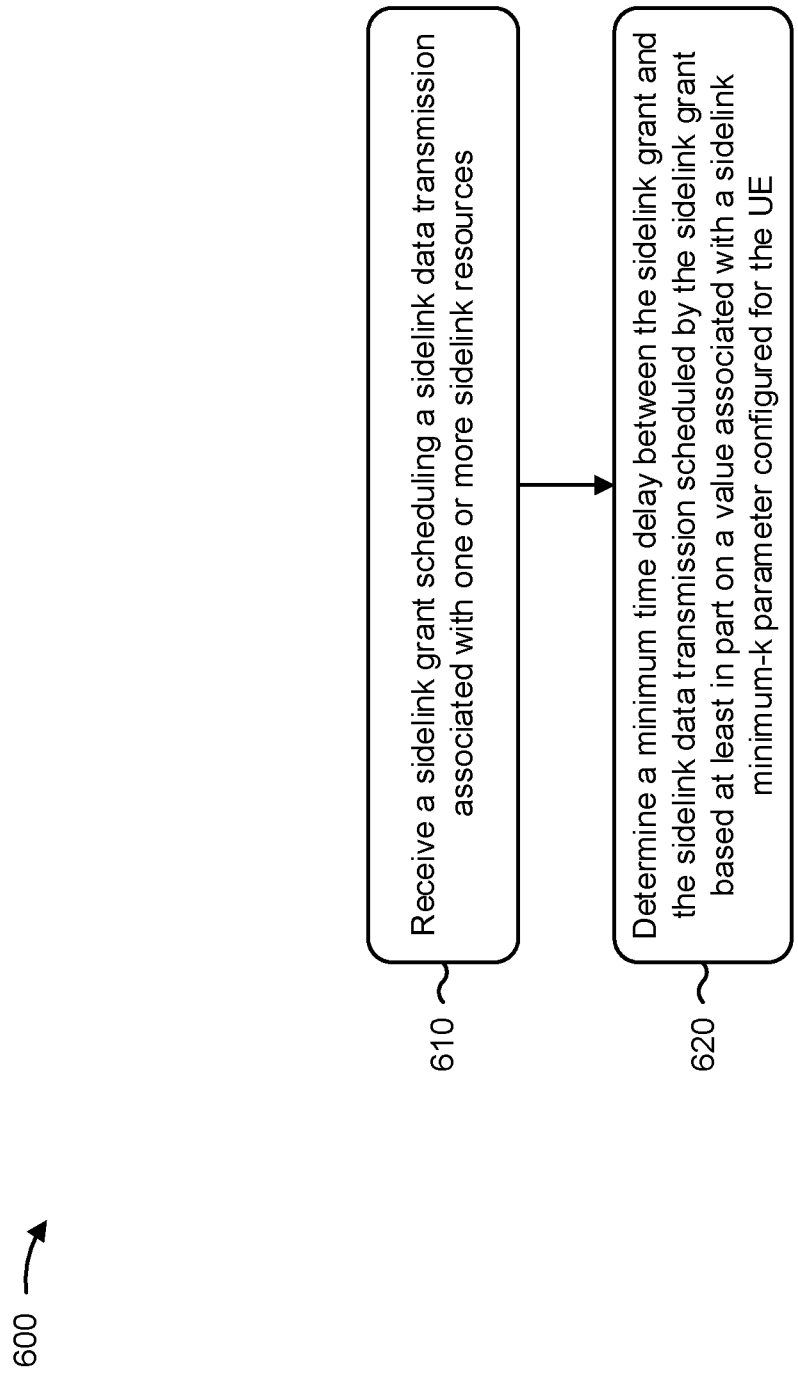
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120, UE 305-1, UE 305-2, Tx/Rx UE 405, Rx/Tx UE 410, sidelink UE 510, and/or the like) performs operations associated with a minimum time delay between a sidelink grant and a scheduled sidelink data transmission.

As shown in FIG. 6, in some aspects, process 600 may include receiving a sidelink grant scheduling a sidelink data transmission associated with one or more sidelink resources (block 610). For example, the UE may receive (e.g., using antenna 252, DEMOD 254, MIMO detector 256, receive processor 258, controller/processor 280, memory 282, and/or the like) a sidelink grant scheduling a sidelink data transmission associated with one or more sidelink resources, as described above.

As further shown in FIG. 6, in some aspects, process 600 may include determining a minimum time delay between the sidelink grant and the sidelink data transmission scheduled by the sidelink grant based at least in part on a value associated with a sidelink minimum-k parameter configured for the UE (block 620). For example, the UE may determine (e.g., using controller/processor 280, memory 282, and/or the like) a minimum time delay between the sidelink grant and the sidelink data transmission scheduled by the sidelink grant based at least in part on a value associated with a sidelink minimum-k parameter configured for the UE, as described above.

Process 600 may include additional aspects, such as any single aspect or any combination of aspects described below and/or in connection with one or more other processes described elsewhere herein.

In a first aspect, the sidelink grant is received from a base station over an access link or from another UE over a sidelink.

In a second aspect, alone or in combination with the first aspect, the sidelink grant indicates whether the sidelink data transmission is to be transmitted by the UE or received by the UE.

In a third aspect, alone or in combination with one or more of the first and second aspects, the sidelink grant indicates a RAT associated with the sidelink data transmission.

In a fourth aspect, alone or in combination with one or more of the first through third aspects, the value of the sidelink minimum-k parameter is based at least in part on a type associated with the sidelink grant.

In a fifth aspect, alone or in combination with one or more of the first through fourth aspects, the value associated with the sidelink minimum-k parameter is indicated in the sidelink grant.

In a sixth aspect, alone or in combination with one or more of the first through fifth aspects, the minimum time delay is based at least in part on the sidelink grant indicating a change to the value associated with the sidelink minimum-k parameter.

In a seventh aspect, alone or in combination with one or more of the first through sixth aspects, the change to the value associated with the sidelink minimum-k parameter is applicable to only a grant type associated with the sidelink grant.

In an eighth aspect, alone or in combination with one or more of the first through seventh aspects, the change to the value associated with the sidelink minimum-k parameter is applicable to a plurality of grant types.

In a ninth aspect, alone or in combination with one or more of the first through eighth aspects, the value associated with the sidelink minimum-k parameter or a change to the value associated with the sidelink minimum-k parameter is indicated in DCI, RRC signaling, a MAC-CE, or SCI.

In a tenth aspect, alone or in combination with one or more of the first through ninth aspects, process 600 includes determining that the minimum time delay does not apply to the sidelink data transmission scheduled by the sidelink grant, based at least in part on the sidelink grant satisfying an exception condition.

In an eleventh aspect, alone or in combination with one or more of the first through tenth aspects, process 600 includes turning off an RFFE of the UE for at least the minimum time delay after receiving the sidelink grant based at least in part on the sidelink minimum-k parameter having a non-zero value and turning on the RFFE of the UE to transmit or receive the sidelink data transmission after the minimum time delay has elapsed.

In a twelfth aspect, alone or in combination with one or more of the first through eleventh aspects, process 600 includes using one or more communication components to transmit or receive the sidelink data transmission after the minimum time delay between the sidelink grant and the sidelink data transmission has elapsed.

In a thirteenth aspect, alone or in combination with one or more of the first through twelfth aspects, process 600 includes refraining from using one or more communication components to transmit or receive the sidelink data transmission until the minimum time delay between the sidelink grant and the sidelink data transmission has elapsed.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
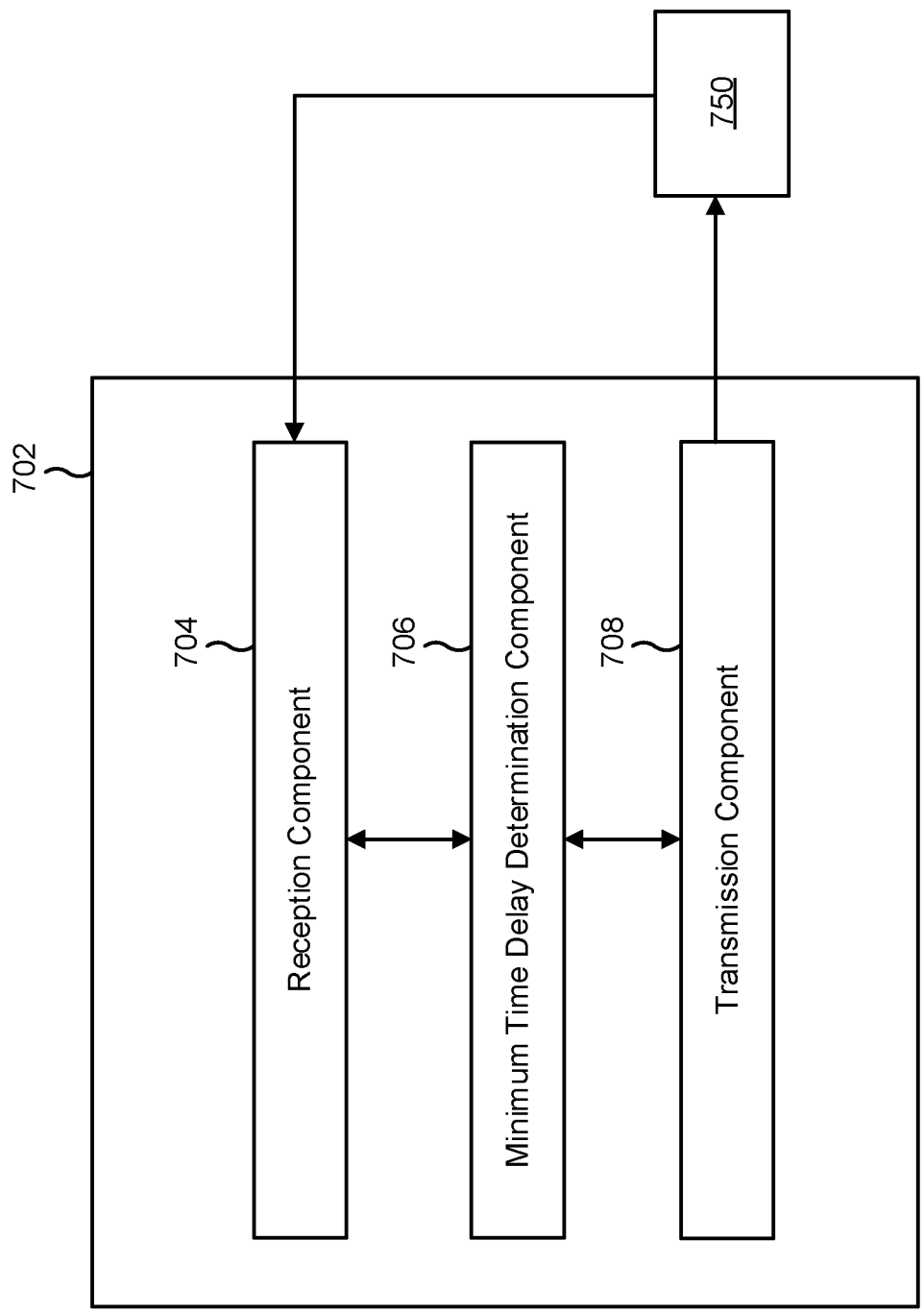
FIG. 7 is a conceptual data flow diagram illustrating an example of a data flow between different components in an example apparatus, in accordance with the present disclosure.

FIG. 7 is a conceptual data flow diagram 700 illustrating a data flow between different components in an example apparatus 702. The apparatus 702 may be a UE (e.g., UE 120, UE 305-1, UE 305-2, Tx/Rx UE 405, Rx/Tx UE 410, sidelink UE 510, and/or the like). In some aspects, the apparatus 702 includes a reception component 704, a minimum time delay determination component 706, and/or a transmission component 708.

Reception component 704 may receive a sidelink grant and/or a sidelink data transmission from apparatus 750. For example, reception component 704 may receive a sidelink grant scheduling a sidelink data transmission associated with one or more sidelink resources from apparatus 750, may receive a sidelink data transmission from apparatus 750 after a minimum time delay has elapsed since reception component 704 received the sidelink grant (e.g., based at least in part on a value associated with a sidelink minimum-k parameter configured for the apparatus 702, and/or the like). In some aspects, reception component 704 may include an antenna (e.g., antenna 252), a receive processor (e.g, receive processor 258), a controller/processor (e.g., controller/processor 280), a transceiver, a receiver, and/or the like.

Minimum time delay determination component 706 may determine a minimum time delay between a sidelink grant received via reception component 704 and a sidelink data transmission scheduled by the sidelink grant based at least in part on a value associated with a sidelink minimum-k parameter configured for the apparatus 702. For example, in some aspects, the value of the sidelink minimum-k parameter may depend on a type of the sidelink grant (e.g., depending on whether the sidelink grant is received from a base station over an access link or from another UE over a sidelink, whether the sidelink data transmission is to be transmitted by the apparatus 702 or received by the apparatus 702, a RAT associated with the sidelink data transmission, and/or the like). In some aspects, minimum time delay determination component 706 may include a processor (e.g., a transmit processor 264, a receive processor 258, a controller/processor 280, and/or the like).

Transmission component 708 may transmit one or more messages to apparatus 750. For example, transmission component 708 may transmit a request for a sidelink grant to apparatus 750 (e.g., in cases where apparatus 705 is a base station), may transmit a sidelink data transmission to apparatus 750 (e.g., in cases where apparatus 705 is a UE) after a minimum time delay determined by minimum time delay determination component 706, and/or the like. In some aspects, transmission component 708 may include an antenna (e.g, antenna 252), a transmit processor (e.g, transmit processor 264), a controller/processor (e.g., controller/processor 280), a transceiver, a transmitter, and/or the like.

The apparatus 702 may include additional components that perform each of the blocks in the aforementioned process 600 of FIG. 6 and/or the like. Each block in the aforementioned process 600 of FIG. 6 and/or the like may be performed by a component and the apparatus 702 may include one or more of those components. The components may be one or more hardware components specifically configured to carry out the stated processes, implemented by a processor configured to perform the stated processes, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

Figure 8:
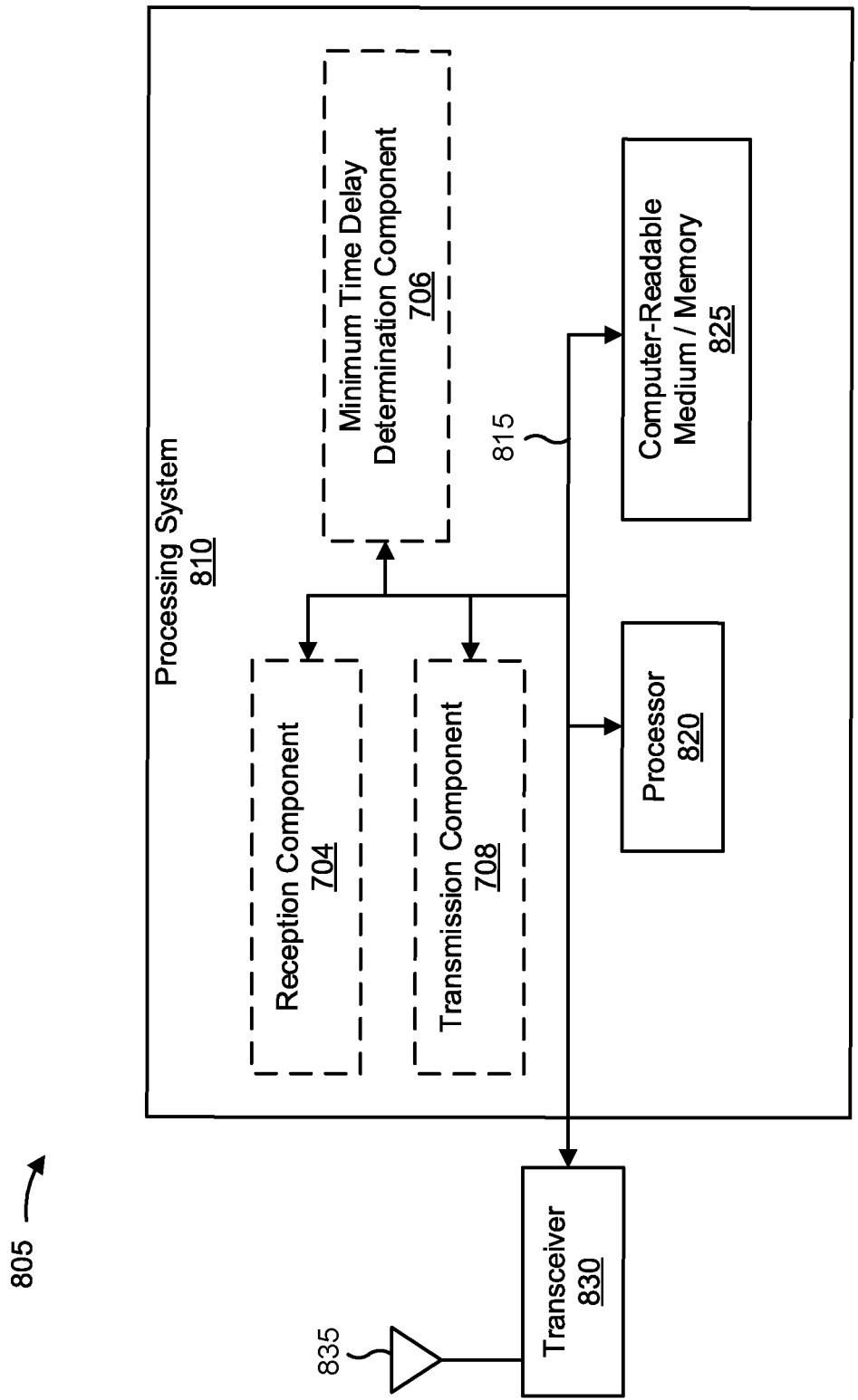
FIG. 8 is a diagram illustrating an example of a hardware implementation for an apparatus employing a processing system, in accordance with the present disclosure.

FIG. 8 is a diagram 800 illustrating an example of a hardware implementation for an apparatus 805 employing a processing system 810. In some aspects, the apparatus 805 may be a UE (e.g., UE 120, UE 305-1, UE 305-2, Tx/Rx UE 405, Rx/Tx UE 410, sidelink UE 510, and/or the like).

The processing system 810 may be implemented with a bus architecture, represented generally by the bus 815. The bus 815 may include any number of interconnecting buses and bridges depending on the specific application of the processing system 810 and the overall design constraints. The bus 815 links together various circuits including one or more processors and/or hardware components, represented by the processor 820, the components 704, 706, and/or 708, and the computer-readable medium/memory 825. The bus 815 may also link various other circuits such as timing sources, peripherals, voltage regulators, and power management circuits, which are well known in the art, and therefore will not be described any further.

The processing system 810 may be coupled to a transceiver 830. The transceiver 830 is coupled to one or more antennas 835. The transceiver 830 provides a means for communicating with various other apparatuses over a transmission medium. The transceiver 830 receives a signal from the one or more antennas 835, extracts information from the received signal, and provides the extracted information to the processing system 810, specifically the reception component 704. In addition, the transceiver 830 receives information from the processing system 810, specifically the transmission component 708, and based at least in part on the received information, generates a signal to be applied to the one or more antennas 835.

The processing system 810 includes a processor 820 coupled to a computer-readable medium/memory 825. The processor 820 is responsible for general processing, including the execution of software stored on the computer-readable medium/memory 825. The software, when executed by the processor 820, causes the processing system 810 to perform the various functions described herein for any particular apparatus. The computer-readable medium/ memory 825 may also be used for storing data that is manipulated by the processor 820 when executing software. The processing system further includes at least one of the components 704, 706, and/or 708. The components may be software modules running in the processor 820, resident/ stored in the computer readable medium/memory 825, one or more hardware modules coupled to the processor 820, or some combination thereof.

In some aspects, the processing system 810 may be a component of UE 120, UE 305-1, UE 305-2, Tx/Rx UE 405, Rx/Tx UE 410, sidelink UE 510, and/or the like, and may include the memory 282 and/or at least one of the TX MIMO processor 266, the RX processor 258, and/or the controller/ processor 280. In some aspects, the apparatus 805 for wireless communication includes means for receiving a sidelink grant scheduling a sidelink data transmission associated with one or more sidelink resources, means for determining a minimum time delay between the sidelink grant and the sidelink data transmission scheduled by the sidelink grant based at least in part on a value associated with a sidelink minimum-k parameter, and/or the like. The aforementioned means may be one or more of the aforementioned components of the apparatus 702 and/or the processing system 810 of the apparatus 805 configured to perform the functions recited by the aforementioned means. As described elsewhere herein, the processing system 810 may include the TX MIMO processor 266, the RX processor 258, and/or the controller/processor 280. In one configuration, the aforementioned means may be the TX MIMO processor 266, the RX processor 258, and/or the controller/ processor 280 configured to perform the functions and/or operations recited herein.

As indicated above, FIG. 8 is provided as an example. Other examples may differ from what is described with respect to FIG. 8.

The following provides an overview of some Aspects of the present disclosure:

Aspect 1: A method of wireless communication performed by a UE, comprising: receiving a sidelink grant scheduling a sidelink data transmission associated with one or more sidelink resources; and determining a minimum time delay between the sidelink grant and the sidelink data transmission scheduled by the sidelink grant based at least in part on a value associated with a sidelink minimum-k parameter configured for the UE.

Aspect 2: The method of Aspect 1, wherein the sidelink grant is received from a base station over an access link or from another UE over a sidelink.

Aspect 3: The method of any of Aspects 1-2, wherein the sidelink grant indicates whether the sidelink data transmission is to be transmitted by the UE or received by the UE.

Aspect 4: The method of any of Aspects 1-3, wherein the sidelink grant indicates a RAT associated with the sidelink data transmission.

Aspect 5: The method of any of Aspects 1-4, wherein the value of the sidelink minimum-k parameter is based at least in part on a type associated with the sidelink grant.

Aspect 6: The method of any of Aspects 1-5, wherein the value associated with the sidelink minimum-k parameter is indicated in the sidelink grant.

Aspect 7: The method of any of Aspects 1-6, wherein the minimum time delay is based at least in part on the sidelink grant indicating a change to the value associated with the sidelink minimum-k parameter.

Aspect 8: The method of Aspect 7, wherein the change to the value associated with the sidelink minimum-k parameter is applicable to only a grant type associated with the sidelink grant.

Aspect 9: The method of Aspect 7, wherein the change to the value associated with the sidelink minimum-k parameter is applicable to a plurality of grant types.

Aspect 10: The method of any of Aspects 1-9, wherein the value associated with the sidelink minimum-k parameter or a change to the value associated with the sidelink minimum-k parameter is indicated in DCI, RRC signaling, a MAC-CE, or SCI.

Aspect 11: The method of any of Aspects 1-10, further comprising: determining that the minimum time delay does not apply to the sidelink data transmission scheduled by the sidelink grant, based at least in part on the sidelink grant satisfying an exception condition.

Aspect 12: The method of any of Aspects 1-11, further comprising: turning off an RFFE of the UE for at least the minimum time delay after receiving the sidelink grant based at least in part on the sidelink minimum-k parameter having a non-zero value; and turning on the RFFE of the UE to transmit or receive the sidelink data transmission after the minimum time delay has elapsed.

Aspect 13: The method of any of Aspects 1-12, further comprising: using one or more communication components to transmit or receive the sidelink data transmission after the minimum time delay between the sidelink grant and the sidelink data transmission has elapsed.

Aspect 14: The method of any of Aspects 1-13, further comprising: refraining from using one or more communication components to transmit or receive the sidelink data transmission until the minimum time delay between the sidelink grant and the sidelink data transmission has elapsed.

Aspect 15: An apparatus for wireless communication at a device, comprising a processor; memory coupled with the processor; and instructions stored in the memory and executable by the processor to cause the apparatus to perform the method of any of Aspects 1-14.

Aspect 16: A device for wireless communication, comprising a memory and one or more processors coupled to the memory, the memory and the one or more processors configured to perform the method of any of Aspects 1-14.

Aspect 17: An apparatus for wireless communication, comprising at least one means for performing the method of any of Aspects 1-14.

Aspect 18: A non-transitory computer-readable medium storing code for wireless communication, the code comprising instructions executable by a processor to perform the method of any of Aspects 1-14.

Aspect 19: A non-transitory computer-readable medium storing a set of instructions for wireless communication, the set of instructions comprising one or more instructions that, when executed by one or more processors of a device, cause the device to perform the method of any of Aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive a sidelink grant scheduling a sidelink data transmission associated with one or more sidelink resources; and
   determine a minimum time delay between the sidelink grant and the sidelink data transmission scheduled by the sidelink grant based at least in part on a value associated with a sidelink minimum-k parameter configured for the UE, the value being based at least in part on a type associated with the sidelink grant.

2. The UE of claim 1, wherein the sidelink grant is received from a base station over an access link or from another UE over a sidelink.

3. The UE of claim 1, wherein the sidelink grant indicates whether the sidelink data transmission is to be transmitted by the UE or received by the UE.

4. The UE of claim 1, wherein the sidelink grant indicates a radio access technology associated with the sidelink data transmission.

5. The UE of claim 1, wherein the value associated with the sidelink minimum-k parameter is indicated in the sidelink grant.

6. The UE of claim 1, wherein the minimum time delay is based at least in part on the sidelink grant indicating a change to the value associated with the sidelink minimum-k parameter.

7. The UE of claim 6, wherein the change to the value associated with the sidelink minimum-k parameter is applicable to only the type associated with the sidelink grant.

8. The UE of claim 6, wherein the change to the value associated with the sidelink minimum-k parameter is applicable to a plurality of grant types.

9. The UE of claim 1, wherein the value associated with the sidelink minimum-k parameter or a change to the value associated with the sidelink minimum-k parameter is indicated in downlink control information, radio resource control signaling, a medium access control (MAC) control element (MAC-CE), or sidelink control information.

10. The UE of claim 1, wherein the one or more processors are further configured to:
    determine that the minimum time delay does not apply to the sidelink data transmission scheduled by the sidelink grant, based at least in part on the sidelink grant satisfying an exception condition.

11. The UE of claim 1, wherein the one or more processors are further configured to:
    turn off a radio frequency front end of the UE for at least the minimum time delay after receiving the sidelink grant based at least in part on the sidelink minimum-k parameter having a non-zero value; and
    turn on the radio frequency front end of the UE to transmit or receive the sidelink data transmission after the minimum time delay has elapsed.

12. The UE of claim 1, wherein the one or more processors are further configured to:
    use one or more communication components to transmit or receive the sidelink data transmission after the minimum time delay between the sidelink grant and the sidelink data transmission has elapsed.

13. The UE of claim 1, wherein the one or more processors are further configured to:
    refrain from using one or more communication components to transmit or receive the sidelink data transmission until the minimum time delay between the sidelink grant and the sidelink data transmission has elapsed.

14. The UE of claim 1, wherein the type associated with the sidelink grant comprises at least one of a mode-1 sidelink grant, a mode-2 sidelink grant, a mode-3 sidelink grant, or a mode-4 sidelink grant.

15. A method of wireless communication performed by a user equipment (UE), comprising:

receiving a sidelink grant scheduling a sidelink data transmission associated with one or more sidelink resources; and determining a minimum time delay between the sidelink grant and the sidelink data transmission scheduled by the sidelink grant based at least in part on a value associated with a sidelink minimum-k parameter configured for the UE, the value being based at least in part on a type associated with the sidelink grant.

16. The method of claim 15, wherein the sidelink grant is received from a base station over an access link or from another UE over a sidelink.

17. The method of claim 15, wherein the sidelink grant indicates whether the sidelink data transmission is to be transmitted by the UE or received by the UE.

18. The method of claim 15, wherein the sidelink grant indicates a radio access technology associated with the sidelink data transmission.

19. The method of claim 15, wherein the value associated with the sidelink minimum-k parameter is indicated in the sidelink grant.

20. The method of claim 15, wherein the minimum time delay is based at least in part on the sidelink grant indicating a change to the value associated with the sidelink minimum-k parameter.

21. The method of claim 20, wherein the change to the value associated with the sidelink minimum-k parameter is applicable to only the type associated with the sidelink grant.

22. The method of claim 20, wherein the change to the value associated with the sidelink minimum-k parameter is applicable to a plurality of grant types.

23. The method of claim 15, wherein the value associated with the sidelink minimum-k parameter or a change to the value associated with the sidelink minimum-k parameter is indicated in downlink control information, radio resource control signaling, a medium access control (MAC) control element (MAC-CE), or sidelink control information.

24. The method of claim 15, further comprising:
determining that the minimum time delay does not apply to the sidelink data transmission scheduled by the sidelink grant, based at least in part on the sidelink grant satisfying an exception condition.

25. The method of claim 15, further comprising:
turning off a radio frequency front end of the UE for at least the minimum time delay after receiving the sidelink grant based at least in part on the sidelink minimum-k parameter having a non-zero value; and turning on the radio frequency front end of the UE to transmit or receive the sidelink data transmission after the minimum time delay has elapsed.

26. The method of claim 15, further comprising:
using one or more communication components to transmit or receive the sidelink data transmission after the minimum time delay between the sidelink grant and the sidelink data transmission has elapsed.

27. The method of claim 15, further comprising:
refraining from using one or more communication components to transmit or receive the sidelink data transmission until the minimum time delay between the sidelink grant and the sidelink data transmission has elapsed.

28. The method of claim 15, wherein the type associated with the sidelink grant comprises at least one of a mode-1 sidelink grant, a mode-2 sidelink grant, a mode-3 sidelink grant, or a mode-4 sidelink grant.

29. A non-transitory computer-readable medium storing one or more instructions for wireless communication, the one or more instructions comprising:
one or more instructions that, when executed by one or more processors of a user equipment (UE), cause the one or more processors to:
receive a sidelink grant scheduling a sidelink data transmission associated with one or more sidelink resources; and
determine a minimum time delay between the sidelink grant and the sidelink data transmission scheduled by the sidelink grant based at least in part on a value associated with a sidelink minimum-k parameter configured for the UE, the value being based at least in part on a type associated with the sidelink grant.

30. An apparatus for wireless communication, comprising:
means for receiving a sidelink grant scheduling a sidelink data transmission associated with one or more sidelink resources; and
means for determining a minimum time delay between the sidelink grant and the sidelink data transmission scheduled by the sidelink grant based at least in part on a value associated with a sidelink minimum-k parameter configured for the apparatus, the value being based at least in part on a type associated with the sidelink grant.

* * * * *